Hemphill & Knox,
Water Wheel,
No 5,645. Patented June 20, 1848.

UNITED STATES PATENT OFFICE.

FRANCIS M. HEMPHILL AND ROBERT H. KNOX, OF WASHINGTON, OHIO.

IMPROVEMENT IN WATER-WHEELS.

Specification forming part of Letters Patent No. 5,645, dated June 20, 1848.

*To all whom it may concern:*

Be it known that we, FRANCIS M. HEMPHILL and ROBERT H. KNOX, of Washington, in the county of Fayette and State of Ohio, have invented certain new and useful Improvements in Water-Wheels; and we do hereby declare that the following is a full, clear, and exact description of the principle or character which distinguishes them from all other things before known, and of the usual manner of making, modifying, and using the same, reference being had to the accompanying drawings, which form a part of the same.

Figure 1:
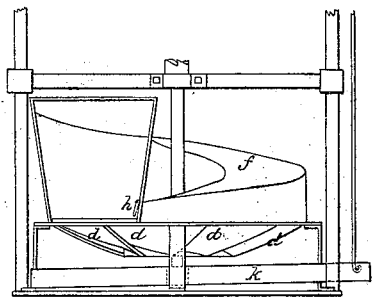
Figure 2:
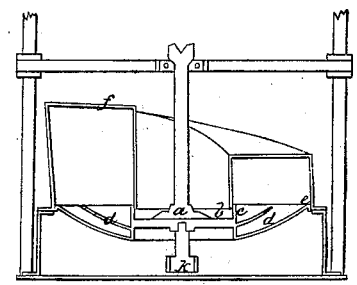
Figure 3:
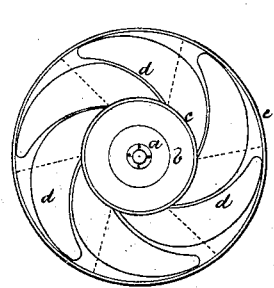
Figure 3:
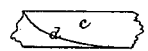
Figure 4:
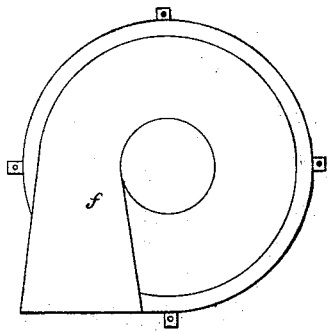

Figure 1 represents a side elevation. Fig. 2 is a vertical section through the shaft. Fig. 3 is a plan of the wheel. Fig. 4 is a plan of the chute.

The nature of our invention consists in constructing a wheel that shall run while flooded without becoming smothered in the tail-water, the curve and pitch of the buckets and the direction of the water thereon from the chute being such that the waste power of the water after it leaves the wheels shall be expended to force back the surrounding column, so as to leave the wheel free, and combining the wheel with the chute in such a way as to permit it to be raised and lowered by the bridge-tree in which it is stepped, there being a rim around the outer edge of the wheel that just fits the rim of the chute inside, and a recess being formed inside the buckets and inner rim $c$ of the wheel, which is made to fit the inner rim of the chute, the wheel being thereby susceptible of being raised and lowered by the bridge-tree $k$ in a manner similar to that now employed in grist-mills to raise the runner-stone.

The construction is as follows: The wheel is made of cast-iron and may be in one piece, and the outside of the wheel below is in outline somewhat like the section of an ellipsis. The hub $a$ has a thin metal flange $b$ projecting horizontally from it, to which a rim $c$ is attached at right angles, as clearly shown in the drawings, against which the inner ends of the buckets are attached. The top edges of these buckets $d$ commence in a direction tangential to a circle a little less than the rim $c$ and curve round to the outer rim $e$ of the wheel, in which they are terminated in a line nearly corresponding with said rim. From the top of the inner rim $c$ they also curve downward in the line represented by a parabolic curve, as shown in Fig. 3—viz., the buckets overlap each other considerably at the inner ends, but they gradually pass off toward the periphery, as is clearly indicated by the dotted lines in Fig. 3. The opening for the reception of the water is somewhat larger near the inner rim than at the outer edge. At the discharge the space is about equal. The line of the upper edge of the bucket and its rear or lower edge meet in the rim $e$. The outside of the outer rim $e$ and the inside of the inner rim $c$ are both turned or otherwise made true to exactly fit the outer and inner rims of the chute. The top of the chute $f$ is made spiral, commencing with a proper magnitude at the flume and gradually tapering down as it winds around the wheel till it meets the tangent part that connects with the flume, at which point on the inside a safety-valve $h$ is hinged by its upper edge to the top of the chute, so as to prevent the currents at that point from disturbing each other, while it will at the same time yield and rise to any obstacles that may chance to get into the wheel.

To obtain sufficient capacity in the chute without carrying it too high, we flare the upper part outward, as is clearly shown in the section, Fig. 2. By this means we get sufficient space to avail ourselves of the static pressure of the column of water in the forebay all around the wheel by admitting a larger supply than can be used in the wheel. Hence it becomes necessary to make the wheel play in the chute without leaking much, while at the same time and for other purposes it can be made to rise or fall, as before stated.

Having thus fully described our improved wheel and chute, what we claim therein as new, and desire to secure by Letters Patent, is—

1. Constructing the wheel, as above set forth, with an outer and inner rim to fit the chute, in which it runs in such a way that the wheel can be raised or lowered in it without affecting the leak of water, the wheel and chute being so formed as to clear the tail-water in the manner specified.

2. The safety-valve $h$ in the chute, attached thereto in the manner and for the purpose above described.

FRANCIS M. HEMPHILL.
ROBERT H. KNOX.

Witnesses:
J. J. GREENOUGH,
R. D. GRANGER.